DATA TRANSFER AND CONVERSION SYSTEM

Filed April 9, 1957 3 Sheets-Sheet 1

INVENTORS
WERNER BUCHHOLZ
HERBERT K. WILD
WILLIAM WOLENSKY
BY John E. Dougherty Jr.
ATTORNEY

DATA TRANSFER AND CONVERSION SYSTEM

Filed April 9, 1957 3 Sheets-Sheet 2

June 28, 1966 W. BUCHHOLZ ETAL 3,258,584

DATA TRANSFER AND CONVERSION SYSTEM

Filed April 9, 1957 3 Sheets-Sheet 3

United States Patent Office 3,258,584

Patented June 28, 1966

3,258,584

DATA TRANSFER AND CONVERSION SYSTEM

Werner Buchholz and Herbert K. Wild, Wappingers Falls, and William Wolensky, Poughkeepsie, N.Y., assignors to International Business Machines Corporation, New York, N.Y., a corporation of New York Filed Apr. 9, 1957, Ser. No. 651,654

25 Claims. (Cl. 235—164)

The present invention relates to a data handling system and more particularly to a data transfer system which employs a matrix of bistable elements and which is capable of performing both parallel to serial and serial to parallel conversion of information characters which may be expressed in any one of a plurality of codes.

Control and/or conversion matrix systems, capable of receiving data from one machine unit in one form and supplying that data in a different form to a further machine unit, are incorporated in most computing and data handling systems. For example, it is often necessary in computer applications that a plurality of information items stored in adjacent positions of a register be transferred to another register in transposed form or to an arithmetic unit as a series of groups of items of prescribed length. One example of a control matrix system of this general type is disclosed in Patent Number 3,054,091 issued September 11, 1962, from copending application No. 630,133 filed December 24, 1956, in behalf of A. E. Brennemann et al. and assigned to the assignee of the subject application. The disclosure of this copending application is directed toward a system which utilizes both the sonic and memory properties of bars of ferroelectric material in controlling the transfer and transposition of a plurality of information items either within a single register or accompanying the transfer of the items from one register to another. The concept, first disclosed in said copending application, of storing each information item in each storage element in a corresponding column of a coordinate array of storage elements, allows for a large degree of flexibility. However, since in the ferroelectric matrix the operation is dependent upon the linear "piezoelectric" response of the ferroelectric material, the signal to noise ratio of output signals is relatively low. In view of this and also because of the sequence of signals produced on each output line during each shift operation, it is advisable to time sample the output signals developed. As a further incident to the utilization of the sonic properties of bars of ferroelectric material, there is an inherent and unavoidable delay in the transfer of the information items between registers.

A prime object of the present invention is to provide an improved data transfer system.

Another object is to provide an improved data handling system utilizing a matrix of magnetic core switching and/or memory elements.

A further object is to provide a data conversion system which is extremely flexible and may handle, without sacrificing capacity, characters represented in any one of a plurality of different codes, each of which contains a different number of items per character.

These objects, as well as other objects hereafter set forth, are accomplished as is illustrated in one embodiment of the invention herein described, by utilizing in a control matrix a plurality of magnetic cores arranged in columns and rows. The cores employed are of the well known bistable type exhibiting two stable states of flux remanence and preferably exhibit only a very slight change in flux density when driven from a remanent to a saturation condition in the same direction. The matrix is provided with eight input lines each of which links all the cores in an associated column, eight output lines each of which links all the cores in an associated row, and eight drive lines arranged diagonally so that each links one core only in each column and one core only in each row of the matrix. In operation a plurality of information items is entered in the matrix by applying signals to selected ones of the input lines. The signals applied are of sufficient magnitude to reverse the state of each of the cores linked by lines to which they are applied. In this way each information item is stored in each core in an associated column of the matrix, the entire group of items being stored completely in each row of the matrix. Each of the output lines is coupled to the cores in a corresponding row of the matrix and output signals may be developed on these lines representative of the stored items in any desired shifted or transposed form merely by pulsing the proper one of the shift drive lines. The interrogation, by pulsing the shift drive lines, is destructive; the applied pulses being effective to switch all the cores in a particular one of the remanent states to the other remanent state, whereas the cores originally in said other remanent state are merely driven from remanence to saturation in the same direction. Since these two states represent the two binary digits, one and zero, the flux change produced in a core which is switched is appreciably larger than the flux change in the other cores and thus the signal to noise ratio is high. Further there is no delay in realizing the output, the switching being accomplished at exceedingly high speeds thereby producing output signals which are practically coincident in time with the interrogation signals applied to the drive lines. By energizing proper ones of the drive lines in sequence and controlling the gating devices in the output circuits the information items may be broken up and transferred in serial groups of any desired size to any position or positions of an output register.

A second embodiment illustrates a matrix operable in this manner which is arranged to handle a plurality of information characters represented in either a single bit, four bit or six bit code and further illustrates the flexibility realizable in systems constructed in accordance with the principles of the invention which may, of course, be employed in constructing matrices for handling information characters represented in any number of different codes, each of which requires a different number of bits per character. The matrix in this embodiment is rectangular, there being six cores in each column and a larger number of cores in each row. Input lines and output lines are arranged, as before, linking cores in corresponding columns and rows of the matrix and the shift drive lines are arranged, as before, diagonally. However, each shift line links only six cores, each in a different column and row, and shift pulses are applied by ring circuitry in such a manner that every one, every fourth one or every sixth one of the shift lines may be pulsed sequentially in accordance with the character code of the stored items. Gating circuitry, which may be controlled in conjunction with the circuitry applying the sequence of shift pulses, is provided in the output circuits so that output signals are transmitted only on a desired one or ones of these lines, again in accordance with the character code being processed.

In accordance with a third embodiment, a similar arrangement may be utilized to convert a series of characters, expressed in either a single, a four or a six bit code into a parallel word. Again it should be noted that the choice of single, four and six bit characters is merely by way of illustration and systems for handling characters expressed in any number of codes may be constructed in accordance with the principles of the invention herein disclosed. In this mode of operation, the groups of bit representing signals are successively applied as half-select pulses to the lines associated with the rows of the matrix and, coincidently with the application of each such group of pulses, a half-select pulse is applied to one of the drive lines. In this way the items comprising the series of characters are stored, one in each column of the matrix, and may be read out in parallel to produce signals on the individual lines associated with these columns after all the characters have been entered.

Thus, another object becomes that of producing an improved buffer control system capable of serial to parallel or parallel to serial conversion of information characters represented in any one of a plurality of different bit codes.

Another object is to provide a magnetic core control matrix particularly suited to effecting the conversion of characters represented in any one of a plurality of different codes wherein the number of cores extending in one coordinate direction of the matrix is less than that in the other coordinate direction and is equal to the number of bit positions in the one of the codes requiring the most bits per character.

Another object is to provide a matrix of this type wherein the information characters entered may comprise different numbers of individual bits and the control lines may be selectively pulsed in sequential combinations differing in accordance with the number of bits in the characters entered.

Other objects of the invention will be pointed out in the following description and claims and illustrated in the accompanying drawings, which disclose, by way of example, the principles of the invention and the best mode, which has been contemplated, of applying the principle.

Figures 2, 3:
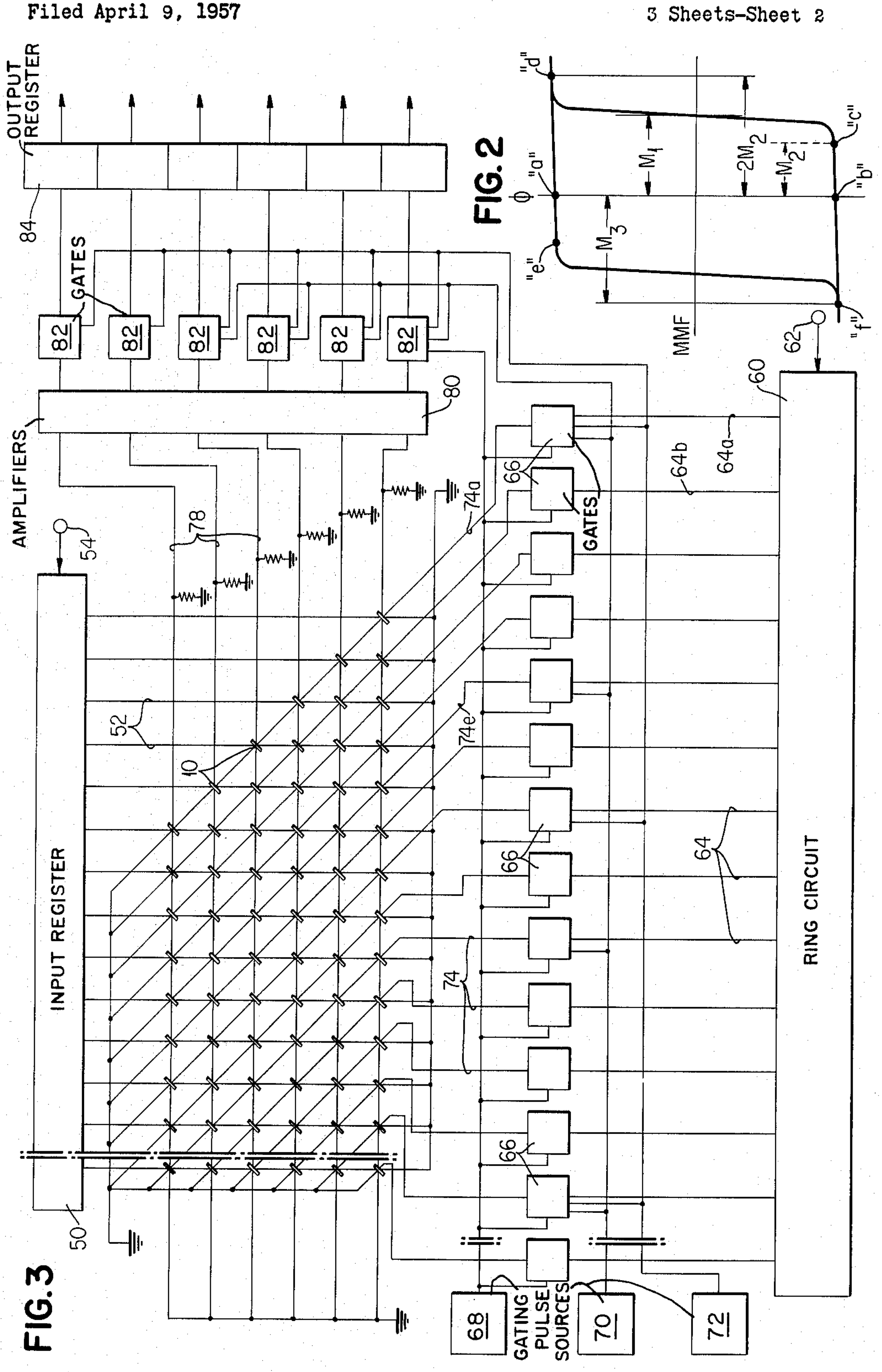
FIG. 2 shows a typical hysteresis loop for a magnetic core such as may be employed in the arrays of the present invention.
FIG. 3 shows a buffer system for parallel to serial conversion of single, four, and six bit characters.

Referring now to FIG. 2, there is shown a plot of flux ($\phi$) versus magnetomotive force (M.M.F.) for a core of magnetic material such as might be employed in the matrix of the present invention. The loop as shown is essentially square and exhibits the relatively definite knee or threshold advantageous for half-select type operation. The two remanent states of the core are designated "*a*" and "*b*" and, in binary applications, these states are employed to represent the binary digits one and zero. In the instant disclosure, by way of example, the remanent state at "*a*" is designated as the binary one representing state and the remanent state at "*b*" the binary zero representing state. The coercive force for the core, that is the force necessary to reverse the direction of magnetization in the core is represented as $M_1$. In half-select type operation, wherein the coincidence of drive pulses on two lines linking the core are required to drive the core from one remanent state to the other, the magnetomotive force supplied by each drive pulse may be as shown as $M_2$. Upon the application of such a pulse, the loop is traversed from "*b*" to "*c*" and, upon its termination, the core returns to its initial remanent state at "*b*." However, when two such pulses are coincidently applied, the total force is equal to $2M_2$ and, as indicated, is effective to cause the loop to be traversed along the segment "*bcd*" and, upon termination of this applied force, the core assumes the opposite remanent state at "*a*." The core may be interrogated by applying thereto a force greater than the coercive force and of a polarity to switch the core only if it is in the binary one state at "*a*." Such a force is represented at $M_3$ and, when applied with the core in the binary one state at "*a*," it causes the loop to be traversed along the segment "*aef*" which represents a relatively large flux change and causes an appreciable output to be developed in an output winding provided on the core. When the force $M_3$ is applied with the core in the binary zero state at "*b*" the flat segment "*bf*" is tranversed and no appreciable output is induced on the output winding. In either case, upon termination of the interrogation signal, the core assumes the binary zero representing state at "*b*."

Figure 1:
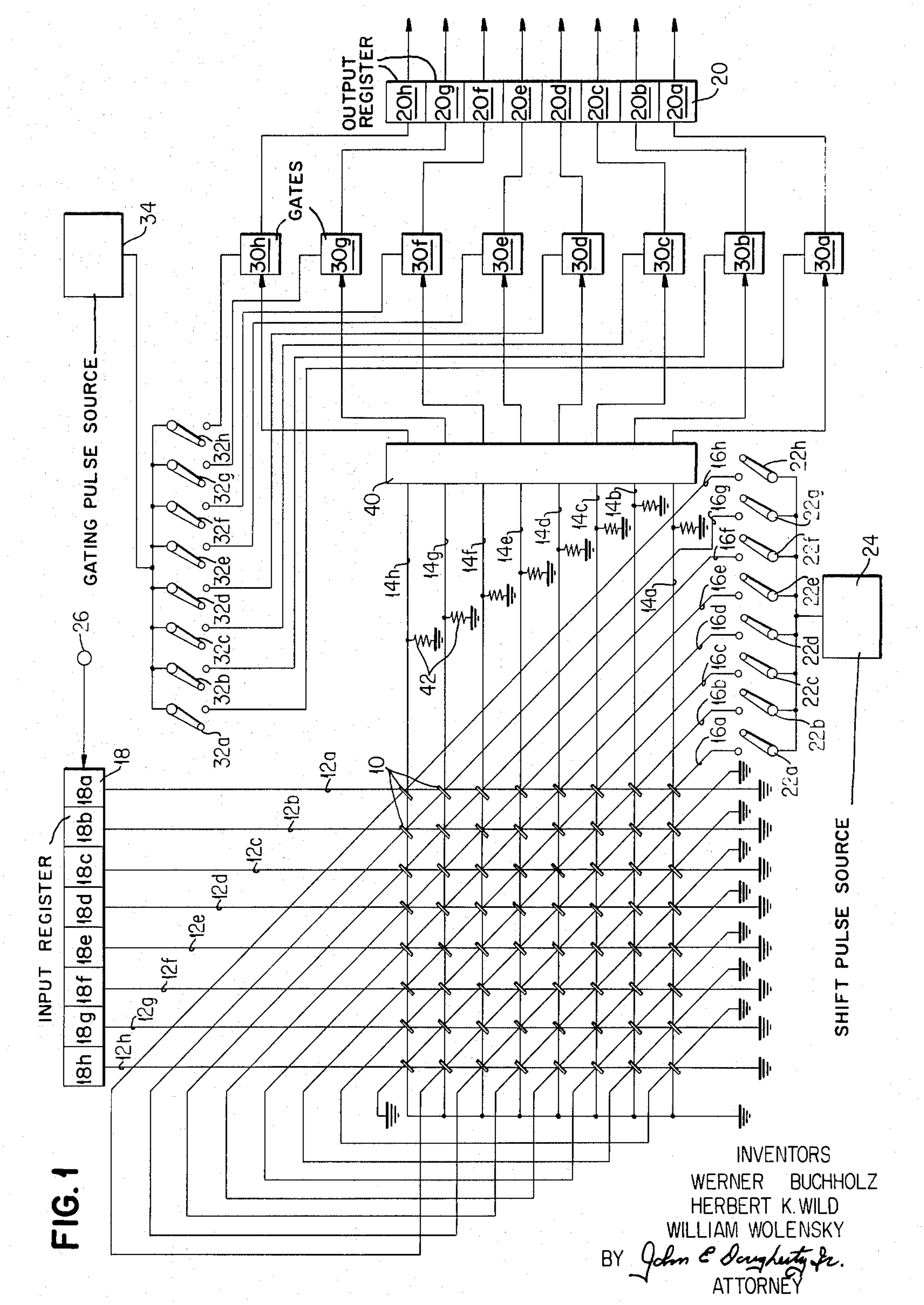
FIG. 1 shows a first embodiment of the invention wherein a square matrix of bistable device is employed in a data handling system.

An eight by eight matrix of cores 10 of this type is shown in FIG. 1 together with the drive and output lines necessary for operation in accordance with the principles of the invention. The cores 10 in the matrix are arranged in columns and rows and there are provided eight input drive lines **12*a*–12*h*, each of which links the cores in one column of the matrix. There are also provided eight output lines 14*a*–14*h* each of which links all of the cores in one row of the matrix, and eight shift drive lines 16*a*–16*h*** which are arranged diagonally so that each links eight cores no two of which are in the same column or same row.

The matrix serves as a buffer between an input register 18 and an output register 20 both of which are shown in box form since the registers, per se, form no part of the present invention. The function of the matrix is to receive the bits, forming the word or words stored in register 18, in parallel form and transmit them in any desired form or sequence to the output register 20.

All of the cores 10 in the matrix are initially set in the binary zero remanent state "*b*" (FIG. 2) which may be accomplished, for example, by operating all of a group of eight switches **22*a*–22*h* to allow a pulse of proper magnitude and polarity to be supplied by a shift pulse source 24 to all of the shift drive lines 16*a*–16*h*. The bits forming the word stored in register 18 are then read out in parallel by the application of a pulse to a terminal 26. The drive lines 12*a*–12*h*** are connected to the output terminals of this register, the operation of which is such that, when interrogated, there is developed, on each output terminal for a storage position in which a one bit is stored, a signal of sufficient magnitude and proper polarity to cause all of the cores linked by the connected drive line to be driven from the zero representing state at "*b*" of FIG. 2 to the one representing state at "*a*." There are no signals developed at the output terminals for storage positions of register 18 in which a zero is stored and thus the cores 10 in the columns associated with the input drive lines connected to these terminals remain in the binary zero representing state "*b*," As a result of this operation each of the bits initially stored in register 18 is stored in one core in each row of the matrix and all of the cores in any one column are in the same state representing the bit stored in the storage position of register 18 with which the input drive line for the column is associated.

The transfer of the bits in the information item from the matrix of cores 10 to the output register 20 is under control of the switches **22*a*–22*h* and a plurality of gating circuits 30*a*–30*h*. The gating circuits are also under the control of a group of switches 32*a*–32*h*. It should, of course, be understood that mechanical switches are illustrated merely to simplify the explanation of the invention and that in actual practices electronic devices are preferably employed to perform these switching functions. The common terminal of the switches 32*a*–32*h* is connected to a signal gating pulse source 34. In order to open any of the gates 30*a*–30*h*, it is only necessary to operate the associated one of the switches 32*a*–32*h***.

For example, if it is desired, to transfer the item originally stored in register 18 in the same form to register 20 all of the switches **32*a*–32*h* are closed and switch 22*a* is operated. Operation of switch 22*a* allows signal source 24 to apply to shift drive line 16*a* a pulse of sufficient magnitude and proper polarity to drive all of the cores 10 linked by this drive line which are in the binary one representing state "$a$" to the binary zero representing state "$b$" (FIG. 2). This switching represents a relatively large flux change. Only a relatively small flux change is experienced in the cores 10 initially in the binary zero state "$b$" as the segment "$bf$" is traversed. The large flux changes in the cores 10, which are switched from the one to the zero state, cause pulses to be induced in the output lines 14$a$–14$h$ which link them. These pulses are amplified by the one of a plurality of amplifiers, here represented by box 40, connected to that output line. The amplified output signals are passed through the associated gates and applied as inputs to the corresponding storage positions of registers 20. It should be noted that the magnitude and rise time of the shift pulse, the number of turns on the output windings, and the value of the resistors 42 which shunt the output lines 14$a$–14$h$ to ground are such that the current flow through the output lines due to the switching of a core 10** is insufficient to change the remanent state of the other cores associated therewith which are not being interrogated.

When it is desired to transfer the entire informational item in shifted form, the operation is the same with the exception that a different one of the switches 22$a$–22$h$ is operated. For example, the item may be transferred with a column shift of one to the right by operating switch 22$h$. In this regard it should be noted that the storage positions of the registers 18 and 20 are designated 18$a$–18$h$ and 20$a$–20$h$, the "$a$" position in each case being the lowest order position. Operation of switch 22$h$ allows signal source 24 to apply a pulse to shift drive line 16$h$ thereby causing the digit stored in the column of the array connected to the second storage position 18$b$ of register 18 to be entered in the lowest order position 20$a$ of shift register 20. The other digits are similarly shifted one position to the right and the lowest digit, stored in the column associated with the lowest order position 18$a$ of register 18, is, if switch 32$h$ remains closed and gate 30$h$ thereby maintained open, entered into the highest order position 20$h$ of register 20. If it is desired, as is often the case, to spill over or not retain digits shifted past a certain position during a shifting operation of this nature, it is necessary only to leave switch 32$h$ open thereby allowing gate 30$h$ to prevent the entry of information into the high order position 20h of register 20. Column shifts of any amount can be accomplished in a similar manner and the number of significant digits of the shifted item transferred into register 20 may be restricted merely by opening selected ones of the switches 32$a$–32$h$. For example, a column shift of seven to the right, which actually represents a shift of one column to the left, may be accomplished by operating switch 22$b$ and the high order position digit may be either entered into the lower order position of 20$a$ of register 20 or "spilled over" by closing or opening switch 32$a$.

It should be noted that once the item stored in input register 18 is entered in the matrix of cores 10, the above described transferring operations may be accomplished sequentially without regeneration as long as no one of the shift lines 16$a$–16$h$ is pulsed more than once. For example, the switches 22$a$—22$h$ may be operated successively so that the item stored in the control matrix is read out successively with increasing column shifts to the right. This is possible since each shift line links only one group of cores 10, including one core in each row and one core in each column and no two cores in the same column or row, and it is only the information stored in the cores linked by the particular shift winding pulsed that is destroyed during each interrogation operation. Where successive interrogations of this type are accomplished it is, of course, necessary to clear the register 20 between each operation and higher order digit positions may be re-entered in the lower position of the shift register or spilled over by properly setting the switches 32$a$–32$h$.

The individual bits of information originally entered in parallel may be read out serially into any one position of the register 20 and from there to further circuitry merely by opening all of the switches 32$a$–32$h$ but the one controlling the gate coupled to the position of register 20 into which the digits are to be entered and then operating the switches 22$a$–22$h$ in proper sequence. For example, the bits may be entered serially into position 20$b$ only, by opening all but switch 32$b$ and then operating the shift control switches in the following order 22$b$, 22$c$, 22$d$, 22$e$, 22$f$, 22$g$, 22$h$, 22$a$; it being, of course, understood that the bits are transferred from the register 20 between successive interrogation operations.

The bits forming the information item stored in the matrix of cores 10 may be broken down into groups of any size which are transferred serially. For example, if the four bits stored in positions 18$a$–18$d$ represent a first binary decimal character and the bits originally stored in positions 18$e$–18$h$ represent a second binary decimal character, these groups of four bits might be transferred, in what might be termed a parallel by bit serial by character form, through register 20 to further circuitry which might, for example, be in the form of an arithmetic unit capable of adding the two binary decimal characters. This might be accomplished, utilizing the four lower order positions of the register 20, by first closing switches 32$a$, 32$b$, 32$c$ and 32$d$ and then operating switches 22$a$ and 22$e$ in sequence, the digits entered in the four lower orders of register 20 as a result of the first interrogation being, of course, entered in the arithmetic unit before the second interrogation.

Groups of digits representing information characters may also be transposed by selectively operating the switches 32$a$–32$h$ and 22$a$–22$h$. For example, the two binary decimal characters above described may be transposed with the bits in each character unshifted by first closing all of the switches 32$a$–32$h$ and operating switch 16$e$. This, which of course represents a column shift of four with the digits spilled over being entered in the lower orders of register 20 results in the four digit making up the character originally stored in the four low order positions of register 18 being stored in proper sequence in the four high order positions of register 20 and the bits which form the character originally stored in the high order positions of register 18 being stored in proper sequence in the low order positions of register 20.

The entire informational item might also be transferred with only one or two digits transposed. For example, the item might be transferred, with only the digits originally stored in positions 18$d$ and 18$e$ transposed, by first operating switch 22$a$ with all of the gate switches but switches 32$d$ and 32$e$ closed; then operating switch 22$h$ with only gate switch 32$d$ closed; and finally operating switch 22$b$ with only gate switch 32$e$ closed.

The informational item stored in the matrix of cores 10 may thus be read out into register 20 and thence to other circuitry either serially in groups of any desired length, with or without shifting, or in parallel in either shifted or transposed form.

Another embodiment of the invention, designed for a particular computer application is shown in FIG. 3. Here the matrix of cores 10 is rectangular in form, there being sixty columns and only six rows in the matrix. The matrix is designed for operation in a system wherein the bits of information entered therein from the register may represent either individual binary digits, or numeric characters each of which is represented by four information bits, or alphabetic characters each of which is represented by six information bits. Information bits representative of data in any of these forms is first entered in the input register 50, the output terminals of which are coupled to the input drive lines 52. Considering the cores 10 to be initially in the binary zero condition at "$b$" (FIG. 2), the bits stored in register 50 are entered in the matrix by applying at terminal 54 a pulse which is effective to cause a pulse to be developed at the output terminal for each position of the storage register in which a binary one is stored. These pulses are applied to the connected output drive lines 52 and are effective to cause each of the cores linked thereby to assume the binary one position at "*a*" of FIG. 2. The information item originally stored in register 50, and transferred into the matrix of cores 10 with the entire item stored in each row of the matrix, may consist of either sixty individual information bits, or fifteen groups of four bits with each group representing a numeric character of information, or ten groups of six bits with each group representing an alphabetic character of information. Thus, regardless of the number of bit positions required by each of the characters entered, each storage position of the register and each column of the matrix is utilized to store one bit. The information is read out of the matrix by a series of pulses supplied by a ring circuit shown in box form and designated 60. This circuit when actuated, for example by the application of a pulse at a terminal 62, supplies a series of 60 pulses successively to a group of output lines designated 64. The first of these pulses is applied to line 64*a*, the second to line 64*b*, etc. These pulses are fed as inputs to a group of gating circuits 66, which are normally closed but may be opened by the application of gating pulses, selectively applied by one of a group of three signal sources 68, 70, 72. The outputs of the gating circuits 66 are coupled to the shift drive lines, here designated 74. The magnitude and polarity of the pulses supplied by any one of the gating circuits 66 to a connected shift drive line 74 are such that any of the cores 10, linked by that drive line, which are in the binary one condition at "*a*" of FIG. 2, are switched to the binary zero condition at "*b*." This switching represents a relatively large flux change causing appreciable outputs to be sensed by those of the output lines, here designated 78, which link the cores switched. The output signals induced on lines 78 are as before amplified by one of the sense amplifiers, represented by the box designated 80, and applied as inputs to a corresponding one of the gating circuits 82. The outputs of these gating circuits are connected to the inputs of a second register 84. The gates 82 are also controlled by gating signals supplied by the signal sources 68, 70 and 72. The information originally entered in the matrix of cores 10 is read out by first actuating the proper one of the gating signal sources 68, 70 or 72 and then applying a pulse at terminal 62 to start ring circuit 60. Signal source 68 is connected to each of the gates 66 so that when actuated the pulses supplied by ring circuit 60 are applied to all of the shift drive lines in succession. This signal source is actuated when it is desired to read the item out of the matrix serially by bit. Signal source 68 is also connected to the lowest one of the gates 82 so that the bits serially read out of the matrix are successively entered in the lowest order position of register 84, it being, of course, understood that in this type of operation as well as in operations about to be described, this register is cleared between the successively applied ring pulses and the stored bits transmitted to further machine circuitry. Signal source 70 is connected to every fourth one of the gates 60 and to the lower four of the gates 82. This source is actuated when the information stored in the matrix is in the form of a plurality of four bit numeric characters. Signal source 72 is connected to every sixth one of the gates 66 and to each of the gates 82 and is actuated when the information stored in the register is in a six bit alphanumeric code.

Consider the case where the information stored is represented by a four bit code. In this case signal source 70 is actuated thereby allowing every fourth one of the gates 66 to pass the pulse supplied thereto by ring circuit 60. The first pulse supplied by the ring circuit is thus applied to shift drive winding 74*a* and is effective to interrogate the six cores 10 linked by that winding. Since only the lower four of the gates 82 are open when signal source 70 is actuated, only the four bits stored in the cores in the lower four rows of the matrix will be entered in register 84. The four bits originally stored in the four lower orders of register 50 are thus read out of the matrix into the four lower order positions of register 84 from which they are transferred to other machine units. Since the second, third and fourth pulses supplied by ring circuit 60 are applied to gates 66 which are closed, they are ineffective to read information out of the matrix. The fifth pulse, however, is applied to a gate 66 which is kept open by the signal supplied by source 70 and is therefore effective to interrogate the six cores linked by shift drive line 74*e*. The cores in the lower four rows of the matrix which are linked by this line store the bits originally stored in the fifth, sixth, seventh and eighth positions of register 50. The second group of four bits is thus read out of the matrix and entered in the four lower order positions of register 84 for transmission to further circuitry. This operation continues, the four bit characters being read out serially from the matrix until all fifteen of the characters have been transmitted to output register 84. The operation is similar when the bits are read out serially, or where six bit characters are read out serially, the primary difference being that, in the first case, signal source 68 is actuated and each shift drive is pulsed in sequence whereas, in the latter case, signal source 72 is actuated and shift pulses are applied only to the first and every sixth drive line in sequence.

It should be noted that, in the embodiment shown in FIG. 3, the time interval between the characters successively read out of the matrix differs for different codes. The time interval between successive six bit characters is, of course, greater than between four bit characters and that between four bit characters than between single bit characters. These time intervals may be kept constant by replacing the single ring circuit 60 and gates 66 of FIG. 3 with three ring circuits, one of which is connected to all the shift drive lines and is effective when actuated to supply shift pulse to these lines in succession; the second ring circuit is connected to every fourth shift drive line 74 and is effective when actuated to supply shift pulse to these lines in succession, the third ring circuit is connected to every sixth drive line 74 and is effective to supply shift pulses to these lines in succession. The proper ring circuit for the bit code being handled is selectively actuated by circuitry, not shown, in the same manner as the three gate signal sources 68, 70 and 72 are actuated and, thereafter, the operation is essentially the same as described above with the exception that the time interval between successive interrogations is the same for different length characters.

Figure 4:
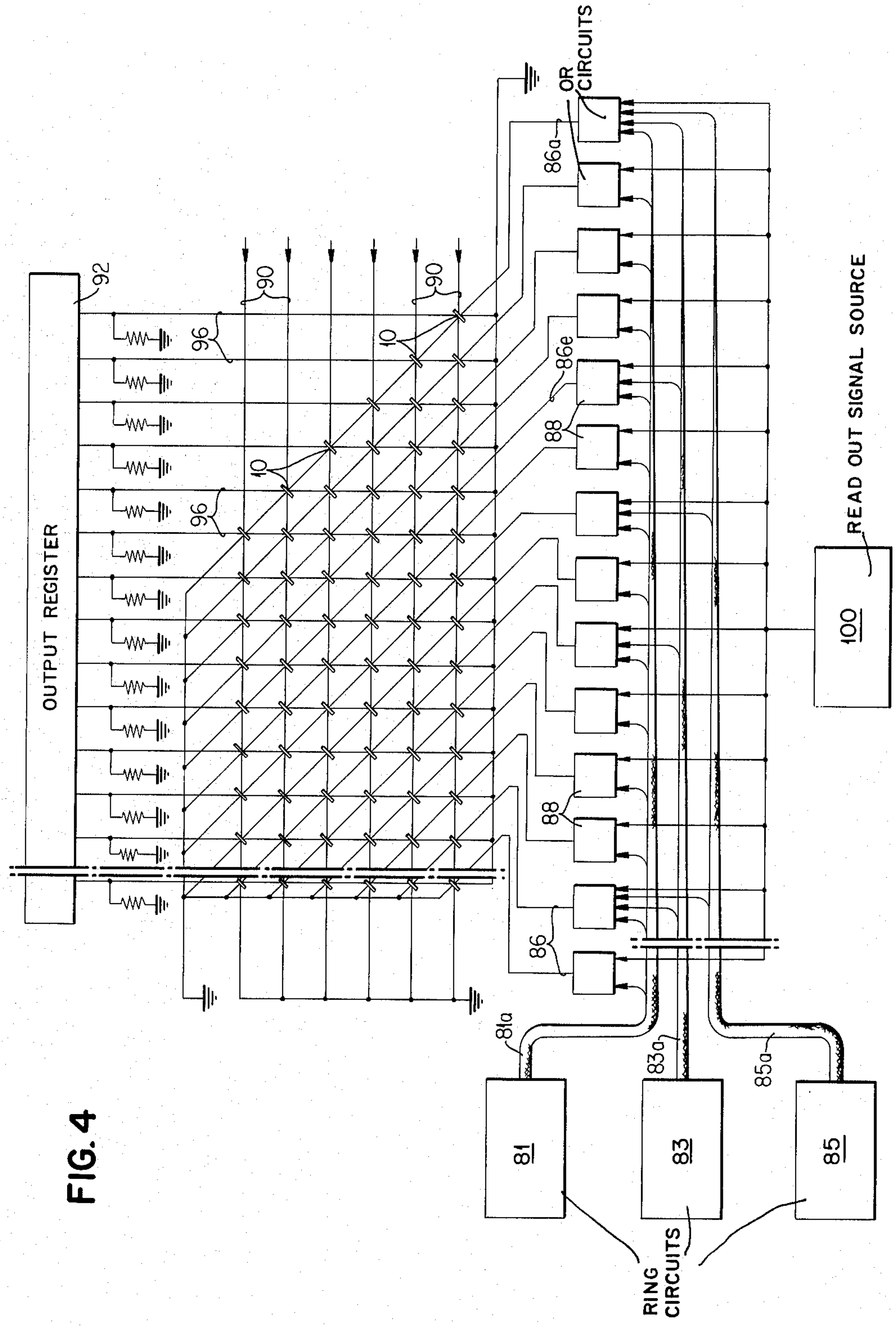
FIG. 4 shows a buffer system for serial to parallel conversion of single, four, and six bit characters.

Three such ring circuits are represented by boxes designated 81, 83 and 85 in FIG. 4; the ring circuit 81 being coupled to all sixty of the diagonally arranged drive lines 86 and capable of applying a pulse to each in succession; the ring circuit 83 being coupled to every fourth one of the lines 83 and being capable of actuating these fifteen lines in succession, and the ring circuit 85 being coupled to every sixth one of the lines and capable of applying pulses to these lines in succession. Cables 81*a*, 83*a* and 85*a*, which include the leads to which the ring circuit pulses are individually applied, extend from the three ring circuits with the proper leads being connected as inputs to OR circuits 88. Each one of these OR circuits is connected to one of the diagonally arranged drive lines 86. Though arrangement of this nature might be employed in a system operated as described with reference to FIG. 3, the embodiment of FIG. 4 is included to illustrate the manner in which the invention concept is applied to a system wherein the information input to the matrix is in the form of serially applied characters, which may be of varying length, and the output is taken in parallel. The inputs to the system of FIG. 4 are applied to the horizontally arranged drive lines 90, each of which links all of the cores 10 in one row of the matrix.

The operation of the system may be understood by considering how fifteen four bit characters, applied serially by character and parallel by bit to input drive lines 90, are stored in the matrix of cores 10 and finally read out and entered in parallel into a register 92. It should be noted that the box 92 in FIG. 4 represents not only the output register but the sense amplifiers coupled to the output lines 96. The binary one bits are, as before, represented by the presence of a pulse and the binary zero bits by the absence of a pulse. The binary one bit pulses are, of themselves, of insufficient magnitude to switch the cores 10, being what are termed half-select pulses. However, when one of these pulses is applied to a core 10 coincidently with the application of a similar half-select pulse supplied by one of the ring circuits 81, 83, 85 and transmitted through one of the OR circuits 88 to the connected diagonal drive line 86, the core is switched and an output signal is induced on the one of the vertically arranged sense lines 96 which links that core. When the entry information is in the form of a four bit code, ring circuit 83 is actuated to supply pulses, through appropriate OR circuits 88, to the first, fifth, ninth, etc., diagonally arranged drive lines 86 in succession. The timing is such that the first of these pulses is applied to the first drive line 86*a* coincidently with the application of the bit pulses, representing the first character, to the lower four of the input drive lines 90; the second pulse from source 83 is applied to the fifth drive line 85*e* coincidently with the application of the bit pulses, representing the second in the series of four bit characters, to the input drive lines 90, etc. The bits representing each character are thus stored in adjacent columns in the matrix, the lowest order bit of each character being stored in lowest row in the array, the second order bits in cores in the next higher row, etc. The characters thus entered in the core matrix may be read out and entered into register 92 in parallel by actuating a signal source 100 from which source parallel connections extend through appropriate OR circuit 88 to every one of the diagonal drive lines 86. The signals supplied by source 100 are applied by the diagonal drive lines to all the cores in the array and are of sufficient magnitude and proper polarity to switch the cores from the binary one to the binary zero. Output pulses are induced on each of the sense lines 96 which links a core thus switched and these pulses are applied as inputs to register 92.

The operation is similar when the information input is in the form of single bit or six bit characters, the only difference being that different ring circuits are employed to apply pulses to the proper diagonal drive lines in succession. The system is thus capable of receiving on input lines 90 a series of different length characters and converting these serially applied characters to a single word or item of information which is entered in parallel into register 92.

It should also be noted that as each of the input items is entered, the particular core in which it is stored experiences a large flux change and, thus, the serially entered characters may, if desired, be entered immediately in the proper positions of register 92. When it is desired, as in the operation described above, to enter all of the characters in register 92 in parallel, properly actuated gating circuitry may be utilized to condition register 92 to receive information only at the time the entire matrix is interrogated by the signals supplied by signal source 100.

Further note should be made of the fact that though in the embodiments discussed with reference to FIG. 3 it was assumed that the successive characters in the item were stored in the matrix cores in the order in which they were to be read out; that is, for example, it was assumed that where four bit characters were entered the first character to be read out was stored in the four columns of the matrix at the extreme right. Such may not be always the case and it may be desired to construct a random access system in accordance with the principles of the invention. The principles of such a system are, of course, illustrated in FIG. 1 wherein the switches 22 may be selectively operated to read out the bits or characters comprising the information item or any part thereof in any desired form. A similar arrangement might be utilized in interrogating the core matrix in a system such as is shown in FIG. 3 or in entering information into the matrix in a system such as is shown in FIG. 4. For example, the columns of the matrix might be addressed employing a single ring circuit or a clock pulse generator which is connected to supply a series of pulses in parallel to each of a plurality of gating circuits. Each of the gating circuits is connected to a corresponding one of the columns in the matrix. The gating circuits, in such an arrangement, are under the control of selective addressing circuitry which is capable of opening any one of the gating circuits at a time corresponding to the time any particular one of the clock pulses is applied by the pulse generator to that gating circuit.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention therefore, to be limited only as indicated by the scope of the following claims.

What is claimed is:

1. In an information handling system comprising a matrix of magnetic storage elements arranged in coordinate columns and rows with the number of elements in each of the columns being less than the number of elements in each of said rows, each said magnetic element made of material exhibiting a substantially rectangular hysteresis loop, a group of input lines each associated with the magnetic elements in a corresponding row of said matrix, a plurality of output lines each associated with the magnetic elements in a corresponding column of said matrix, a plurality of control lines each associated with a group of elements including only one element in any one column and only one element in any one row of said matrix, means effective during each of a succession of time intervals to apply to said input lines a plurality of half-select signals each representative of a different information item; and means for causing each of said information items to be stored in only one element in said matrix with each item stored in an element linked by a different one of said output lines comprising means for applying a half-select signal to one of said control lines during the first of said time intervals and to different ones of said control lines during subsequent ones of said time intervals, said half-select information and control signals being applied coincidently during each of said time intervals.

2. In an information handling system comprising a matrix of magnetic storage elements arranged in coordinate columns and rows with the number of elements in each of the columns being less than the number of elements in each of said rows, said magnetic storage elements made of material exhibiting a substantially rectangular hysteresis loop, a group of input lines each associated with the magnetic elements in a corresponding row of said matrix, a plurality of output lines each associated with the magnetic elements in a corresponding column of said matrix, a plurality of control lines each associated with a group of elements including only one element in any one column and only one element in any one row of said matrix, means for simultaneously applying to said input lines a plurality of information representing signals, means for coincidently applying a control signal to a selected one of said control lines to cause each of said items to be stored in a particular element only of said matrix and each item stored in an element linked by a different one of said output lines.

3. In an information handling system comprising a matrix of magnetic elements arranged in coordinate columns and rows with the number of elements in each of the columns being less than the number of elements in each of said rows, said elements made of material exhibiting a substantially rectangular hysteresis loop, a group of input lines each associated with the magnetic elements in a corresponding row of said matrix, a plurality of output lines each associated with the magnetic elements in a corresponding column of said matrix, a plurality of control lines each associated with a group of elements including only one element in any one column and only one element in any one row of said matrix, means effective during each of a plurality of time intervals to apply to either a first or a second predetermined number of said input lines a group of half-select signals representative of a group of information items; and means for causing each of said information items to be stored in only one element in said matrix with each item stored in an element linked by a different one of said output lines comprising means effective during said plurality of time intervals to selectively apply half-select pulses in sequence to either a first or a second group of said control lines in accordance with the predetermined number of said input lines to which said information signals are applied, said half-select control and information signals being applied coincidently during each of said time intervals.

4. A coordinate array of magnetic memory elements having a first predetermined number of columns, said elements made of material exhibiting a substantially rectangular hysteresis loop, each of said columns comprising a second predetermined number of said elements, means for storing in said array a number of information items equal to said first predetermined number with the same item being stored in each magnetic element in a corresponding column of said array, and means for simultaneously reading out one magnetic element in each of a first plurality of columns and then simultaneously reading out one magnetic element in each of a second plurality of columns in said array.

5. The invention as claimed in claim 4 wherein the columns in said first plurality are successive columns in said array and the columns in said second plurality are successive columns in said array.

6. The invention as claimed in claim 4 wherein said first predetermined number is greater than said second predetermined number and the number of columns in each of said first and second plurality is no greater than said second predetermined number.

7. An information handling system comprising an array of coordinately arranged bistable memory elements having a number of columns of elements corresponding to a first predetermined number of information items and having in each column a number of elements corresponding to a second predetermined number of information items, means for causing each element in an associated columns to assume a like state to register a first predetermined number of information items, and means for interrogating one element in each column only of a plurality of columns corresponding to less than said first predetermined number to thereby read out a portion only of said stored first predetermined number of information items.

8. An information handling system comprising an array of coordinately arranged bistable memory elements having a number of columns of elements corresponding to a first predetermined number of information items and having in each column a number of elements corresponding to a different predetermined number, means for storing in said array a number of information items corresponding to said first predetermined number by causing the same item to be stored in each bistable element in a corresponding one of said columns, and means for first simultaneously interrogating one element in each column in a first plurality of successive columns less in number than said first predetermined number and then simultaneously interrogating one element in each column in a second plurality of successive columns less in number than said first predetermined number to thereby successively read out different portions of said first predetermined number of information items.

9. A data handling system comprising a matrix of bistable storage elements arranged in columns and rows, a plurality of input lines each associated with a particular column in said matrix and coupled to the elements in that column, a plurality of output lines each associated with a corresponding row of said matrix and coupled to the elements in that row, means coupled to said input lines for applying signals thereto to enter a plurality of information items in said matrix with each item stored in each element in a corresponding column of said matrix; and means for selectively producing on said output lines signals representative of said items in any one of a plurality of different serial forms comprising a plurality of interrogation lines each coupled to a different group of elements including only one element in any one row and only one element in any one column of said matrix, each of said interrogation lines being effective when energized to cause output signals indicative of items stored in the coupled elements to be produced on particular ones of said output lines, and means for selectively energizing in sequence different combinations of said interrogation lines.

10. In a data handling system for changing a plurality of information items applied in parallel to a series of characters comprising one or the other of two different numbers of items, a matrix of storage elements arranged in columns and rows, a plurality of input lines each associated with a corresponding column of said matrix and coupled to the elements in that column, a plurality of output lines each associated with a corresponding row of said matrix and coupled to the elements in that row, means for simultaneously applying signals to said input lines to cause each of said information items to be stored in each element in a corresponding row of said matrix, a plurality of interrogation lines each coupled to a corresponding group of said elements including only one element in anyone row and one element in any one column of said matrix, each of said interrogation lines being effective when energized to cause output signals indicative of items stored in the coupled elements to be produced on particular ones of said output lines, and means for selectively energizing in sequence one of the other of two different combinations of said interrogation lines.

11. The invention as claimed in claim 10 wherein each of said memory elements comprises a magnetic core made of material exhibiting a substantially rectangular hysteresis loop capable of being caused to assume first and second different conditions of flux remanence.

12. The invention as claimed in claim 10 wherein the number of elements in the columns of said matrix corresponds to a first predetermined number, the number of elements in the rows of said matrix corresponds to a second predetermined number greater than said first predetermined number and the number of elements in said groups coupled to corresponding ones of said interrogation lines is less than said second predetermined number.

13. A data handling system comprising a matrix of bistable storage elements arranged in columns and rows, a plurality of input lines each associated with a particular column in said matrix and coupled to the elements in that column, a plurality of sense lines each associated with a corresponding row of said matrix and coupled to the elements in that row, means for applying input signals to said input lines to thereby enter a plurality of information items in said matrix with each item stored in each element in a corresponding column of said matrix, a plurality of output lines, a plurality of controllable switching devices each coupling one of said sense lines with a corresponding one of said output lines, a plurality of interrogation lines each coupled to a corresponding group of said elements including only one element in any one column and one element in any one row of said matrix, each of said interrogation lines being effective when energized to cause signals indicative of items stored in the coupled elements to be produced on particular ones of said sense lines, and means for controlling the transfer of said items from said matrix to said output lines comprising signal means controllable to selectively energize in sequence different combinations of said interrogation lines, and means for controlling both said switching devices and said signal means.

14. A data handling system comprising a matrix of magnetic cores arranged in a coordinate array; each of said cores exhibiting a substantially rectangular hysteresis loop and being capable of being caused to assume two different stable states of flux remanence; a plurality of input lines for said array; a plurality of output lines for said array; a plurality of shift control lines for said array; one of said plurality of lines being associated with the columns of said array with each line linking the cores in a corresponding one of said columns; another of said plurality of lines being associated with the rows in said array with each line linking the cores in a corresponding one of said rows; the plurality of shift control lines being arranged with each line linking a group of cores including only one core in any one column and one core in any one row of said array; means for simultaneously applying a plurality of information pulses only to said input lines; each of said information pulses representing one value of an information character and each being applied to one of said input lines; means for selectively applying a control pulse to one of said shift control lines whereby all of the magnetic cores associated both with the pulsed shift line and one of said input lines to which one of said information representing pulses is applied are simultaneously switched between said remanent states to simultaneously induce on said output lines pulses representative of said information character.

15. The invention as claimed in claim 14 wherein each of said information and control pulses is of itself of sufficient magnitude to cause cores linked by a line to which it is applied to be switched from one of said remanent states to the other remanent of said states.

16. The invention as claimed in claim 14 wherein the number of cores linked by each of the lines in one of said plurality of lines is equal to a first predetermined number and the number of cores linked by each of the lines in another of said plurality of lines is equal to a different predetermined number.

17. The invention as claimed in claim 14 wherein each of said information and control pulses is of itself of insufficient magnitude to cause cores linked by the line to which it is applied to be switched from either of said remanent states to the other but the combination of an information signal and control pulse coincidently applied to the same core is of sufficient magnitude to switch that core from one of said remanent states to the other of said remanent states.

18. The invention as claimed in claim 17 wherein each of said lines in said first plurality links a larger number of cores than the lines in said third plurality, information pulses are applied to said lines in said first plurality in each of a plurality of successive time intervals, and one of said control pulses is applied to a selected one of said lines in said second plurality during a first one of said time intervals and another of said control signals is applied to a different one of said lines in said second plurality during a second one of said time intervals.

19. A system for imparting a preselected shift in the order of significance of parallel signals representing a numerical word, comprising: a plurality of word registers, each including a multiplicity of storage units; a plurality of order-significant input conductor means for receiving said parallel signals, said input conductor means being coupled to said plurality of registers; first switch control means for selectively registering said parallel signals carried by said conductor means in said storage units of each of said registers; a plurality of order-significant output conductor means to receive said parallel signals from said registers, said output conductor means being coupled to the storage units of each of said registers in an order different from said input conductor means; and second switch control means for applying signals registered in each of said registers to said output conductor means.

20. Apparatus according to claim 19 wherein said storage units comprise magnetic cores for registering binary signals.

21. Apparatus according to claim 19 wherein said plurality of output conductor means is connected to said registers in a relationship with respect to the connection of said input conductor means whereby to vary the arrangement of said parallel signals to effectively multiply said numerical word by various predetermined values.

22. A system for imparting a preselected shift in the order of significance of parallel signals representing a numerical word comprising: a plurality of word registers, each including a multiplicity of magnetic-core devices; a plurality of order-significant input conductors for receiving said parallel signals, said input conductors being coupled to a magnetic-core device in said registers; first switch control means for selectively registering said parallel signals carried by said input conductors in each of said registers; a plurality of order-significant output conductors to receive said parallel signals from said registers, said output conductors being coupled to the magnetic-core devices of each of said registers in an order different from said input conductors; and second switch control means for applying signals registered in each of said registers to said output conductors.

23. An apparatus as described in claim 22, wherein said switch control means each comprise a switching circuit and inductive means for selectively driving the magnetic-core devices in each one of said registers.

24. Apparatus according to claim 22 wherein said first switch control means comprises a switching circuit and inductive means for magnetically driving said magnetic-core devices of a selected register to a level from which said signals in said conductors can alter the magnetic states thereof.

25. A data handling system as set forth in claim 9 wherein each interrogation line is coupled to one element in each row and to one element in each column of said matrix.

References Cited by the Examiner

UNITED STATES PATENTS

| | | | |
|---|---|---|---|
| 2,691,156 | 10/1954 | Saltz et al. | 340—174 |
| 2,719,961 | 10/1955 | Karnaugh | 340—166 |
| 2,732,542 | 1/1956 | Minnick | 340—166 |
| 2,856,596 | 10/1958 | Miller | 340—166 |
| 2,914,754 | 11/1959 | Ganzhorn et al. | 340—174 |
| 2,965,883 | 12/1960 | Miller | 340—174 |
| 3,003,137 | 10/1961 | Kurkjian | 340—166 X |
| 3,015,443 | 1/1962 | Miller | 235—164 |

FOREIGN PATENTS

| | | |
|---|---|---|
| 1,101,201 | 4/1955 | France. |

MALCOLM A. MORRISON, *Primary Examiner.*

WALTER W. BURNS, Jr., EVERETT R. REYNOLDS, IRVING L. SRAGOW, ROBERT C. BAILEY, *Examiners.*

J. W. DORITY, B. S. THARP, J. J. POSTA, M. POKOTILOW, R. R. HUBBARD, M. A. LERNER, I. FABISCH, S. SIMON, *Assistant Examiners.*